United States Patent Office 3,479,418
Patented Nov. 18, 1969

3,479,418
MANUFACTURE OF PHOSPHONOTHIOATES
Thomas M. Melton, Richmond, Va., assignor to Mobil Oil Corporation, a corporation of New York
No Drawing. Filed June 16, 1966, Ser. No. 557,895
Int. Cl. C07f 9/40; A01n 9/36; C08f 45/50
U.S. Cl. 260—973                                    11 Claims

ABSTRACT OF THE DISCLOSURE

Phosphonothioates can be manufactured by reacting phosphonodichlorothioates with alcohols in the presence of at least a catalytic amount of a mercaptan. The phosphonothioates are useful as solvents, plasticizers and insecticides.

---

This invention relates to a process for the manufacture of phosphonothioates. More particularly, it relates to the preparation of the named class of compounds having the formula

wherein R is selected from the group consisting of aromatic, aliphatic, and haloaliphatic radicals and R' is selected from the group consisting of aliphatic, aromatic substituted aliphatic, and haloaliphatic radicals. The chemicals produced by this process are useful as solvents, as plasticizers for vinyl resins and the like, as insecticides, and as intermediates in the production of other insecticides.

According to methods reported for these esters, their preparation can be accomplished from phosphonous dichlorides by several different routes, some of which involve two separate steps. For example, conversion of a phosphonous dichloride with sulfur to the corresponding thiophosphonous dichloride, followed by treatment thereof with the appropriate alcohol and base results in the formation of the desired esters. The same products may also be obtained when a phosphonous dichloride is first reacted with the appropriate alcohol and base and the resulting phosphonite is treated with at least one mole equivalent of sulfur.

The same products may be made in what is essentially a one-step process if the starting material is the phosphonodichlorothioate. Thus, according to Hoffman et al. [J.A.C.S. 80, p. 3945 (1958)] the addition of an appropriate alkylphosphonodichloridothioate to a solution of two equivalents of sodium in an excess of an aliphatic alcohol gave yields of product ranging from 70 to 90% based on the thioate. The use of an organic amine as the hydrogen chloride acceptor proved to be less satisfactory because of the somewhat lower yields of the desired esters and the necessity of employing relatively large volumes of an inert solvent to keep the reaction mixture fluid.

In each of the methods mentioned above, the product esters were produced in a system wherein a base, either sodium alkoxide or a tertiary amine, was used. These bases were not used merely as halogen acid acceptors. They were also necessary for their catalytic effect, because it is known that yields of phosphonothioates are low or nonexistent when alcohols are added to phosphonodichloridothioates in the absence of a base. No products were obtained in this investigation upon the attempted reaction of alcohols and dichloridothioates in the absence of mercaptans.

Since more than a catalytic amount of base is required, in prior art processes, large amounts of solids are precipitated. Because of this aspect of the aforementioned methods, large volumes of solvent are necessary to keep the precipitated solids in suspension, thus necessitating the use of large equipment, or, alternatively, a reduction in the quantity of product which can be produced in a given amount of time.

It is thus an object of this invention to provide a process whereby phosphonothioate esters may be produced in good yields without using solids-forming halogen acid acceptors.

Another object of this invention is to provide a new class of catalysts for effecting reaction between phosphonodichloridothioates and alcohols.

It is a further object to eliminate the use of large volumes of inert solvents to keep the reaction system fluid.

Still further objects will become apparent from the remainder of the specification and the appended claims.

It has been found that the above objects are obtained by reacting a compound of the formula

wherein R is chosen from the group consisting of aromatic, aliphatic, and haloaliphatic radicals, with at least two equivalents of an alcohol having the formula R'OH, where R' is from the group consisting of aliphatic, aromatic substituted aliphatic, and haloaliphatic radicals, in the presence at least a catalytic amount of mercaptan.

A mercaptan, as is the case with an alcohol, will not react with a phosphonodichloridothioate unless the reaction is catalyzed with a base as aforesaid. When it is said that no reaction takes place, it must be understood that the statement is made from the observation that no reaction takes place over a period of many hours at the reflux temperature of the alcohol or inert solvent employed. No extended investigations were made, but it may be that by refluxing for extreme periods some yield will be obtained. This, however, would obviously be impractical in a commercial sense.

It was surprising to discover that an alcohol could be made to undergo reaction with a phosphonodichloridothioate by adding an amount of a mercaptan to the system. It was all the more surprising in view of the fact that neither alcohol nor mercaptan, when used alone, will undergo reaction with the dichlorodothioate in the absence of a base catalyst.

The process may, in its broad aspects, be practiced in the following manner. A phosphonodichloridothioate is placed in a suitable reactor with at least two equivalents of the desired alcohol. A mercaptan, up to an amount equivalent to the quantity of dichloridothioate present in the system, is added, and the mixture is heated, while stirring, for a time necessary to complete the reaction. The mercaptan is thereupon removed in vacuo, and this is followed by distillation of the product, if necessary or desired.

Since the system will generally be liquid throughout the operation of the process, it will usually be unnecessary to employ a solvent. If it does become necessary or expedient, as for example as an aid in heat dissipation, an excess of the alcohol reactant may be used for the purpose. In this event, one will seldom need more than four times the theoretical quantity of alcohol, and usually an amount equal to 1½ times theoretical will be adequate. Inert organic solvents may also be used, provided the reactants and product are soluble therein, and provided further that the solvent can be removed from the product with relative ease. The volume used will not, in general, exceed the volume of the maximum quantity of alcohol stated above. Such other solvents include acetone, benzene nitrobenzene, methyl ethyl ketone, and the like.

The effective amount of mercaptan will vary over a wide range, with useful concentrations extending from about 1% by weight of the phosphonodichloridothioate reactant initially present in the reaction mixture to an amount equivalent thereto. This range, particularly with respect to the lowest percent stated, is not to be considered as limitative since it is contemplated that the use of less than 1% will be within the scope of the present invention. As for the upper limit, there may be instances in which more mercaptan will be necessary, but generally stated the use of a greater quantity will serve no purpose in practicing this invention.

The reaction may be carried out over a temperature range extending from about 35° C. to below the first observable decomposition of the reaction mixture, with the preferred temperature of reaction being within the range of from about 50° C. to about 125° C. When a solvent (or excess alcohol) is used, it will be found generally that the reaction proceeds satisfactorily at the temperature at which the solvent or alcohol refluxes. Obviously, the lower temperatures are less desirable, since longer times to effect reaction will be required.

Times will vary according to reaction conditions and the nature of the reactants, but from about 0.5 to about 3 hours will most often be sufficient to effect complete reaction. Usually the reaction will be essentially complete in about 0.5 hour, but more than 3 hours may be required in some instances, particularly when employing long-chain alcohols or when it is necessary to carry out the reaction at one of the lower temperatures.

Having described the process in general terms, the following are offered as illustrations of specific embodiments of the invention. In the examples which follow, parts are by weight unless otherwise stated.

EXAMPLE 1

A mixture of 59.6 parts of methylphosphonodichloridothioate (0.4 mole), 30.5 parts of propyl mercaptan (0.4 mole), and 78.9 parts of ethyl alcohol (1.68 moles) were placed in a suitable reactor and stirred. The heat of reaction carried the temperature of the mixture to reflux (65° C.) over a period of ½ hour. When the initial reaction had subsided, heat was applied, while continuing to stir, to maintain the temperature at 65° C. for a period of three hours. The excess mercaptan and alcohol were removed in vacuo to a final pot temperature of 60° C. and a final pressure of 30 mm. of Hg. The resulting crude diethyl methylphosphonothioate was distilled to yield 57.4 parts (85.2%) of product boiling at 57–59° C. at 5 mm. The pure product had the following properties:

Refractive index at 24° C., 1.4630
Density at 20°/4° C., 1.0651
P (calc'd) 18.40%; P (found) 18.04%

EXAMPLE 2

The procedure of Example 1 was employed using 59.6 parts of methylphosphonodichloridothioate, 7.6 parts of propyl mercaptan (0.1 mole), and 48.1 parts of propanol. Distillation yielded pure dipropyl methylphosphonothioate having the following properties:

Refractive index at 24° C., 1.4627
Density at 20°/4° C., 1.019
P (calc'd) 18.40%; P (found) 18.04%
S (calc'd) 16.33%; S (found) 16.00%

The following table summarizes other reactions, run substantially in accordance with the method outlined in Example 1, using various types of mercaptans, alcohols and dichloridothioates.

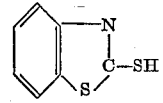

It is apparent from the above examples that one can choose from a wide variety of mercaptans. Those actually employed in practicing this invention indicate that the choice is not to be limited to those shown in the specific embodiments. It therefore appears that the mere presence of the mercapto group is sufficient to drive the reaction between the alcohol and dichloridothioate, and it is contemplated that mercaptans as a class will be effective as catalysts therefore.

The following compounds, which may be prepared in a manner similar to the above examples, will further illustrate the scope of the method disclosed herein. These are: dimethyl methyl-, bis(chlorethyl) methyl-, dibutyl methyl-, dioctyl methyl, didodecyl methyl-, dimethyl ethyl-, bis(chloroethyl) ethyl-, dibutyl ethyl-, dioctyl ethyl-, didodecyl ethyl-, dimethyl propyl-, bis(chlorethyl) propyl-, dibutyl propyl-, dioctyl propyl-, didodecyl propyl-, dimethyl butyl-, bis(chloroethyl) butyl-, dibutyl butyl-, dioctyl butyl-, didodecyl butyl-, dimethyl chloromethyl-, dibutyl chloroethylphosphonothioate, and the like.

I claim:

1. A process for the manufacture of a compound of the formula

wherein R is selected from the group consisting of phenyl, $C_1$–$C_4$ alkyl, chloromethyl and chloroethyl radicals, and R' is selected from the group consisting of $C_1$–$C_{12}$ alkyl, allyl, benzyl and chloroethyl radicals, which comprises reacting one equivalent of a compound of the formula

with at least two equivalents of an alcohol having the formula

R'OH wherein R and R' are as hereinbefore defined, at a temperature from about 35° C. to below the temperature of the first observable decomposition of the reaction mixture, in the presence of at least a catalytic amount of a mercaptan selected from the group consisting of $C_1$–$C_{13}$ alkyl mercaptans, benzyl, tolyl and benzothiazyl mercaptans.

2. The process of claim 1 in which the said mercaptan is an alkyl mercaptan having from 1 to about 13 carbon atoms.

3. The process of claim 1 in which the said mercaptan is benzyl mercaptan.

4. The process of claim 1 in which the said mercaptan is tolyl mercaptan.

5. The process of claim 1 in which the said mercaptan is 2-mercaptobenzothiazole.

6. The process of claim 1 in which said aliphatic mercaptan is propyl mercaptan.

7. The process of claim 1 in which the temperature is from about 35° C. to about 125° C.

8. The process of claim 1 wherein the mercaptan is used to the extent of from about 1% by weight of the said $$\underset{\underset{RPCl_2}{\|}}{S}$$

initially present in the reaction mixture to an amount equivalent thereto.

9. The process of claim 1 wherein the said alcohol is present in a concentration equal to about 1½ to 4 times the theoretical quantity required to react with the said $$\underset{\underset{RPCl_2}{\|}}{S}$$

in the reaction mixture.

10. The process of claim 1 wherein the compound produced is diethyl methylphosphonothioate.

11. The process of claim 1 wherein the compound produced is dipropyl methylphosphonothioate.

No references cited.

CHARLES B. PARKER, Primary Examiner

ANTON H. SUTTO, Assistant Examiner

U.S. Cl. X.R.

260—30.6, 961, 975

UNITED STATES PATENT OFFICE
CERTIFICATE OF CORRECTION

Patent No. 3,479,418  November 18, 1969

Thomas M. Melton

It is certified that error appears in the above identified patent and that said Letters Patent are hereby corrected as shown below:

Column 4, line 9, "P (calc'd.) 18.40%; P (found) 18.04%" should read -- P (calc'd.) 15.76%; P (found) 15.45% --; line 30, Example 6 of Table, "$C_{13}H_2SH$" should read -- $C_{13}H_{27}SH$ --; line 7

$$\underset{RPCl}{\overset{S}{\|}} \quad \text{should read} \quad \underset{RPCl_2}{\overset{S}{\|}}$$

Signed and sealed this 12th day of May 1970.

(SEAL)
Attest:

Edward M. Fletcher, Jr.  WILLIAM E. SCHUYLER, JR.
Attesting Officer  Commissioner of Patents